(12) United States Patent
Barton et al.

(10) Patent No.: US 10,861,027 B1
(45) Date of Patent: Dec. 8, 2020

(54) COMMERCIAL INSURANCE GROWTH DATA FOR AGENTS

(71) Applicant: Allstate Insurance Company, Northbrook, IL (US)

(72) Inventors: Michael Barton, Glenview, IL (US); Wesley Forrest Sprinkle, Tower Lakes, IL (US); Jackson B. Ramsey, III, Naperville, IL (US); Clint J. Marlow, Barrington, IL (US)

(73) Assignee: Allstate Insurance Company, Northbrook, IL (US)

( * ) Notice: Subject to any disclaimer, the term of this patent is extended or adjusted under 35 U.S.C. 154(b) by 1035 days.

(21) Appl. No.: 14/509,644

(22) Filed: Oct. 8, 2014

(51) Int. Cl.
*G06Q 30/02* (2012.01)

(52) U.S. Cl.
CPC .............................. *G06Q 30/0201* (2013.01)

(58) Field of Classification Search
None
See application file for complete search history.

(56) References Cited

U.S. PATENT DOCUMENTS

| | | | |
|---|---|---|---|
| 5,191,522 A | 3/1993 | Bosco et al. | |
| 7,092,964 B1 | 8/2006 | Dougherty et al. | |
| 7,680,681 B2 | 3/2010 | Lotter et al. | |
| 7,734,530 B1 | 6/2010 | Domingue, Sr. et al. | |
| 8,036,919 B2 | 10/2011 | Zizzamia et al. | |
| 8,095,412 B1 | 1/2012 | Zias et al. | |
| 8,200,527 B1 | 6/2012 | Thompson et al. | |
| 8,224,835 B2 | 7/2012 | Kenedy et al. | |
| 8,355,934 B2 | 1/2013 | Virdhagriswaran | |
| 8,417,561 B2 | 4/2013 | Ghosh et al. | |
| 8,589,190 B1 | 11/2013 | Pugh et al. | |
| 8,756,082 B1 * | 6/2014 | Madeyski | G06Q 30/02 705/4 |
| 2004/0054553 A1 * | 3/2004 | Zizzamia | G06Q 10/063 705/4 |

(Continued)

OTHER PUBLICATIONS

Oracle Insurance, Oracle Data Sheet, pp. 1-4, 2009.
Oracle Insurance: Core Applications for the Insurance Industry, brochure, pp. 1-16, 2013, Redwood Shores, CA.
Stuart Nechako, Business Expansion: Expansion Strategies, article, pp. 1-2, http://www.cf-sn.ca/business/business_expansion/expansion.php Apr. 17, 2014.

(Continued)

*Primary Examiner* — Alan S Miller
*Assistant Examiner* — Arif Ullah
(74) *Attorney, Agent, or Firm* — Banner & Witcoff, Ltd.

(57) ABSTRACT

Devices and servers in a commercial insurance growth data system may be configured to receive and respond to requests for commercial insurance growth data from insurance agents. For example, an insurance provider server may be configured to receive commercial insurance information requests from insurance agent devices, determine sets of insurance agent characteristics for the corresponding agents, generate commercial insurance growth data packages based on sets of agent characteristics and other factors, and transmit the commercial insurance growth data packages to the insurance agent devices. The sets of agent characteristics may be provided by an insurance agent user via a software user interface and/or may be retrieved from an insurance agent database. Business segments for commercial insurance growth may be selected by the insurance agent, or may be selected for the insurance agent via an analysis by an insurance provider.

20 Claims, 12 Drawing Sheets

(56) References Cited

U.S. PATENT DOCUMENTS

| | | | |
|---|---|---|---|
| 2004/0143473 A1* | 7/2004 | Tivey | G06Q 10/063112 705/1.1 |
| 2004/0243459 A1 | 12/2004 | Geritz et al. | |
| 2006/0161635 A1* | 7/2006 | Lamkin | G06F 16/4387 709/217 |
| 2010/0004957 A1* | 1/2010 | Ball | G06Q 40/00 705/4 |
| 2010/0076812 A1 | 3/2010 | Ghosh et al. | |
| 2013/0226664 A1 | 8/2013 | Rinzler | |
| 2013/0332316 A1 | 12/2013 | Paul et al. | |
| 2014/0046723 A1* | 2/2014 | Clark | G06Q 30/0201 705/7.29 |
| 2015/0088567 A1* | 3/2015 | Lambroschini | G06Q 10/063112 705/7.14 |

OTHER PUBLICATIONS

John M. Clapp et al., An Examination of Profitability in Spatial Markets: The Case of Life Insurance Agency Locations, http://www.jstor.org/discover/10.2307/252841?uid=3738256&uid=2&uid=4&sid=21103663260981 downloaded Apr. 17, 2014, vol. 57, No. 3 (Sep. 1990), pp. 431-454, American Risk and Insurance Association.

Global Insurance Market Trends, pamphlet, pp. 1-32, 2011, OECD, France.

Jay Nixon, Missouri Department of Insurance, http://insurance.mo.gov.reports/ downloaded Apr. 17, 2014, pp. 1-3, Statistical Reports | Missouri Department of Insurance, Financial Institutions & Professional Registration.

"3 Ways to Make Money," advertisement, HRBC Insurance, Apr. 2013, retrieved from <http://hrbcinsurance.com/wp-content/uploads/2013/04/HRBC-3-Options.pdf>, 1 page.

* cited by examiner

FIG. 4

| State Name | Auto Premium | BOP Other Premium | |
|---|---|---|---|
| Alabama | 1,244.81 | 548.96 | Edit |
| Alaska | 949.00 | 835.57 | Edit |
| Arizona | 949.58 | 599.61 | Edit |
| Arkansas | 884.64 | 866.36 | Edit |
| California | 928.07 | 701.73 | Edit |
| Colorado | 823.45 | 764.66 | Edit |
| Connecticut | 1,194.24 | 661.29 | Edit |
| Countrywide | 1,073.42 | 752.87 | Edit |
| Delaware | 1,032.99 | 701.59 | Edit |
| District of Columbia | 1,523.84 | 602.91 | Edit |
| Florida | 1,446.86 | 428.18 | Edit |
| Georgia | 977.47 | 734.81 | Edit |

FIG. 5

| Commercial Growth Summary | | | | | |
|---|---|---|---|---|---|
| | Year 1 | Year 2 | Year 3 | Year 4 | Year 5 |
| New Commercial Premium | $30,195 | $30,195 | $30,195 | $30,195 | $30,195 |
| Renewal Commercial Premium | $96,305 | $110,751 | $123,398 | $134,471 | $144,185 |
| Total Commercial Premium | | | | | |
| Commercial Book Growth | 15.0% | 11.4% | 9.0% | 7.2% | 5.9% |
| Commercial % Total Book | 9.2% | 10.1% | 10.9% | 11.6% | 12.2% |
| New Premium Goal | $30,195 | $30,195 | $30,195 | $30,195 | $30,195 |
| | | | | | |
| New Business Revenue | $4,529 | $4,529 | $4,529 | $4,529 | $4,529 |
| Renewal Business Revenue | $14,446 | $16,613 | $18,510 | $20,171 | $21,628 |
| | | | | | |
| Est. Telemarketing/Quoting Expense | $1,010 | $1,010 | $1,010 | $1,010 | $1,010 |
| Service Charge Expense | $2,530 | $2,819 | $3,072 | $3,293 | $3,487 |
| | | | | | |
| Annual Cash Flows | $15,435 | $17,313 | $18,957 | $20,396 | $21,657 |
| 5 Year Annual Cash Flow | $93,758 | | | | |

Yearly Cash Flows and Commerical Book Breakdown

FIG. 7

Assumptions and Year One Lead Info

Assumptions

Commercial Book

| | Auto | BOP |
|---|---|---|
| PY Premium (Year 1=2012 CSRP) | $100,000 | $10,000 |
| Policy Retention (Year 1=2012 CSRP) | 85% | 85% |
| Policy Renewal Rate Increase | 3% | 3% |
| % Book Growth | 15% | 15% |

Commissions

| | |
|---|---|
| Agency Success Factors(0% or 1%) | 1% |
| Customer Experience(Range 0% or 1%) | 1% |
| Household Bundling(Range 0% or 1%) | 1% |
| Portfolio Growth(Range 0% or 3%) | 3% |

Lead Estimation

| | |
|---|---|
| Turnover Ratio(Quotes per Contact) | 20% |
| Close Ratio(Sales per Quote) | 30% |
| Commercial Auto Items per Policy | 1.5 |
| Commercial Auto Avg Premium | $1,024 |
| BOP/Other Commercial Items per Policy | 0.4 |
| BOP/Other Commercial Avg Premium | $933 |

Lead Generation Expenses

| | |
|---|---|
| Estimated Minutes Per Call | 10 |
| Telemarketing Cost/Hour | $15.00 |
| Estimated Minutes Per Quote | 20 |
| Quoting Cost/Hour | $20.00 |

Misc. Expenses

| | |
|---|---|
| Service Charge | 2% |

Expenses

Leads — Year 1

| | |
|---|---|
| Required Leads | 264 |
| Turnover Ratio(Quotes per contact) | 20.0% |
| Required Quotes | 53 |
| Close Ratio(Sales per Quote) | 30.0% |
| Required Sales | 15.81 |
| Avg Premium/Sale | $1,910 |
| Commercial Auto Items per Policy | 1.5 |
| Commercial Auto Avg Premium | $1,024 |
| BOP / Other Commercial Items per Policy | 0.4 |
| BOP / Other Commercial Avg Premium | $933 |
| Est. New Business to Achieve Goal | $30,195 |

Call Information — Year 1

| | |
|---|---|
| Estimated Minutes Per Call | 10 |
| Estimated Call Activity in Hours | 44 |
| Available Calling Days per year per Employee | 240 |
| Required Telemarketing - Hours per Day | 0.18 |
| Telemarketing Cost / Hour | $15.00 |
| Estimated Minutes Per Quote | 20 |
| Estimated Quote Activity in Hours | 17.6 |
| Quoting Cost / Hour | $20.00 |
| Estimated Telemarketing/Quoting Expense | $1,010 |

Other Charge Information — Year 1

| | |
|---|---|
| Service Charge | 2% |
| Service Charge Expense | $2,530 |

FIG. 8

COMMERCIAL INSURANCE LEAD LIST FOR ABC INSURANCE AGENT

| Lead Company Name | Address | Phone # | Fax # | Website | Contact Name and Title |
|---|---|---|---|---|---|
| Lead 1 | NNNN | NNN | NNN | XXXX | XXXX |
| Lead 2 | NNNN | NNN | NNN | XXXX | XXXX |
| ... | | | | | ... |

Cont.

| Lead Company Name | Years in Business | # of Employees | Primary SIC Code and Description | Home Based Business? |
|---|---|---|---|---|
| Lead 1 | NN | NNN | XXXX | Y |
| Lead 2 | NN | NNN | XXXX | N |
| ... | | | | ... |

FIG. 9

| Step | Action Taken |
|---|---|
| 1 | Set realistic item and premium goals |
| 2 | Hire a producer to focus on ABI |
| 3 | CFSL review of training needs and solutions including webinars, LRNs and agency visits |
| 4 | Agent – learn of agency rewards program and any regional promotions that can help fund LSP incentives |
| 5 | With LSP, determine processes for quote generation, including:<br>- assess existing circle of influence<br>- outbound calling program to leads for selected industry vertical |
| 6 | Pull Sales Genie leads for producer to call; major/minor vertical selections |
| 7 | Review Certified agent tools in Certified EA Tab in connexus |
| 8 | Begin an active outbound calling program |
| 9 | Monitor the action plan monthly to ensure steps are completed and modified as necessary |
| 10 | Provide agency with back office support that allows him to facilitate business on a daily basis |

FIG. 11A

| Step | Action Taken |
|---|---|
| 1 | Set commercial premium goal and communicate goal with producer and agency |
| 2 | Design ABI compensation plan for LSP |
| 3 | Identify training needs for producer - including processes, products, Connexus quoting, etc. |
| 4 | Agent and LSP complete training through Webinars, LRNs and Connexus On Demand videos |
| 5 | Agent - learn of Certification rewards program and any regional promotions that can help fund LSP incentives |
| 6 | Gain buy-in from LSP on quote generation processes, including re-quotes of previous ALSTAR saved quotes and vertical focused outbound calling program |
| 7 | Select major/minor verticals and utilize existing lead sources to prospect |
| 8 | Review Certified agent tools in Certified EA Tab in Connexus |
| 9 | Begin active outbound calling program with existing leads |
| 10 | Monitor the action plan monthly to ensure steps are completed and modified as necessary |

COMMERCIAL INSURANCE GROWTH DATA FOR AGENTS

TECHNICAL FIELD

Various aspects of the disclosure generally relate to systems and methods of requesting, generating, and providing commercial insurance growth data based on commercial insurance growth goals, agent characteristics, insurance statistics, and configurable assumptions.

BACKGROUND

Although insurance agents sell insurance policies to customers on behalf of insurance providers, the insurance agents themselves often operate independently from the insurance providers. For instance, insurance agents may operate as independent businesses with respect to selecting office locations and sizes, hiring staff, acquiring and serving customers, setting revenue and growth goals, and other business decisions. Some insurance agents may specialize in particular policy types (e.g., home, automobile, life, health, or business) and/or particular types of customers, while other agents may maintain insurance practices covering multiple policy types and a broad range of customer types.

When an insurance agent seeks to grow its business, it may do so by adding new customers or by selling additional policies (or larger policies) to its existing customers. When attempting to acquire new customers, many insurance agents may focus on potential customers from the same geographic region as the agent's current offices, and potential customers having similar insurance needs as their existing customers. By focusing on these types of potential customers, the insurance agent may feel confident that they will be able to provide quality service to all new customers.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, apparatuses, computer-implemented methods, and computer-readable media executable by insurance provider servers and insurance agent computing devices, for receiving and responding to requests for commercial insurance growth data from insurance agents. According to certain aspects, insurance provider servers may be configured to receive commercial insurance information requests from insurance agent devices, determine sets of insurance agent characteristics for the corresponding insurance agents, generate commercial insurance growth data packages based on sets of agent characteristics and other data, and transmit the commercial insurance growth data packages back to the insurance agent devices. The sets of agent characteristics may be provided by an insurance agent user via a software user interface, and/or may be retrieved from an insurance agent database. According to additional aspects, one or more business segments of commercial insurance may be selected by the insurance agent, or may be selected for the insurance agent via an analysis by an insurance provider. The selected business segments may be used to generate the customized commercial insurance growth data for the insurance agent, including specific industry analyses, business action plans, sales leads, and additional relevant commercial insurance growth data.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 4 is an example user interface screen including a set of configurable assumptions that may be used to generate customized a commercial insurance growth data package for an insurance agent, according to one or more aspects of the disclosure.

FIG. 5 is an example user interface screen including lists of average commercial insurance premiums that may be used to generate customized a commercial insurance growth data package for an insurance agent, according to one or more aspects of the disclosure.

FIGS. 6A-11B show examples of data pages or user interface screens that may be included in commercial insurance growth data packages, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
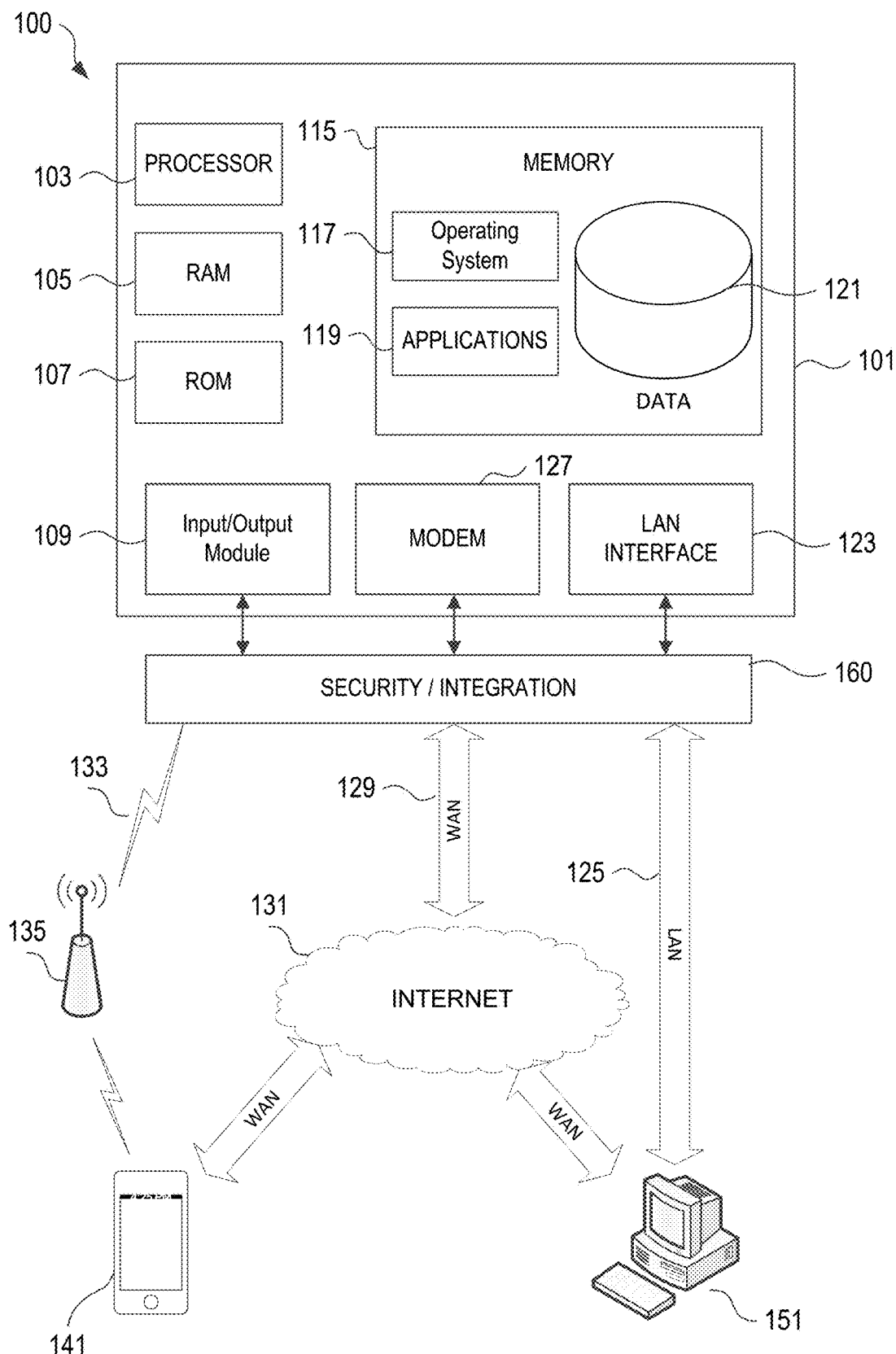
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as mobile computing devices, desktop computers, or computer servers, configured as described herein for submitting and processing requests for commercial insurance data, retrieving commercial insurance data and configuring commercial insurance assumptions, and generating commercial insurance growth data packages based on insurance agent characteristics.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. Certain devices/systems within a commercial insurance data system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., an agent desktop 101, a mobile computing device 101, an insurance server 101, etc.), in order to store and execute a commercial insurance data analysis software application, to collect and analyze agent characteristics, and to generate commercial insurance growth data packages as described below. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to receive and process information requests for commercial insurance data, retrieve commercial insurance data statistics, configure various commercial insurance assumptions, and generate commercial insurance growth data packages based on insurance agent characteristics.

The computing device (e.g., an insurance agent client computing device, an insurance provider server, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable computing devices, etc.) via one or more network devices 135 (e.g., base transceiver stations) in the wireless network 133.

Also illustrated in FIG. 1 is a security and integration layer 160, through which communications may be sent and managed between the device 101 (e.g., an insurance agent's desktop or mobile device, an insurance provider server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a mobile computing device or a server operated by an insurance provider, financial institution, governmental entity, or other organization, may comprise a set of web application servers configured to use secure protocols and to insulate the server 101 from external devices 141 and 151. In some cases, the security and integration layer 160 may correspond to a set of dedicated hardware and/or software operating at the same physical location and under the control of same entities as server 101. For example, layer 160 may correspond to one or more dedicated web servers and network hardware in an organizational datacenter or in a cloud infrastructure supporting a cloud-based commercial insurance data system. In other examples, the security and integration layer 160 may correspond to separate hardware and software components which may be operated at a separate physical location and/or by a separate entity.

As discussed below, the data transferred to and from various devices in the computing system 100 may include secure and sensitive data, such as the confidential business data of insurance agents, growth goals, commercial insurance statistics and assumptions, sales leads, and insurance customer data. Therefore, it may be desirable to protect transmissions of such data by using secure network protocols and encryption, and also to protect the integrity of the data when stored on in a database or other storage in an agent's desktop computer(s), an agent's mobile device(s), and insurance provider server, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., insurance agent business data, sales lead data, etc.) between the various devices 101 in the system 100. Web services built to support system 100 may be cross-domain and/or cross-platform, and may be built for enterprise use. Such web services may be developed in accordance with various web service standards, such as the Web Service Interoperability (WS-I) guidelines. In some examples, a commercial insurance agent data and/or sales lead data web service may be implemented in the security and integration layer 160 using the Secure Sockets Layer (SSL) or Transport Layer Security (TLS) protocol to provide secure connections between servers 101 and various clients 141 and 151 (e.g., desktop or mobile devices, insurance servers, data source servers, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., an insurance agent database, a sales lead database, a commercial insurance assumption database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations, such as faster response times and less dependence on network conditions when transmitting and retrieving insurance agent data, sales lead data, etc., as well as receiving or transmitting software applications or application updates for analyzing commercial insurance data and generating commercial insurance growth data packages for insurance agents.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various computing devices 101 within system 100 (e.g., commercial insurance data analysis software applications, sales lead generation software applications, commercial growth data package generation software applications, etc.), including computer executable instructions for submitting and processing requests for commercial insurance data, retrieving commercial insurance data and configuring commercial insurance assumptions, generating commercial insurance growth data packages based on insurance agent characteristics, and performing other related functions as described herein.

Figure 2:
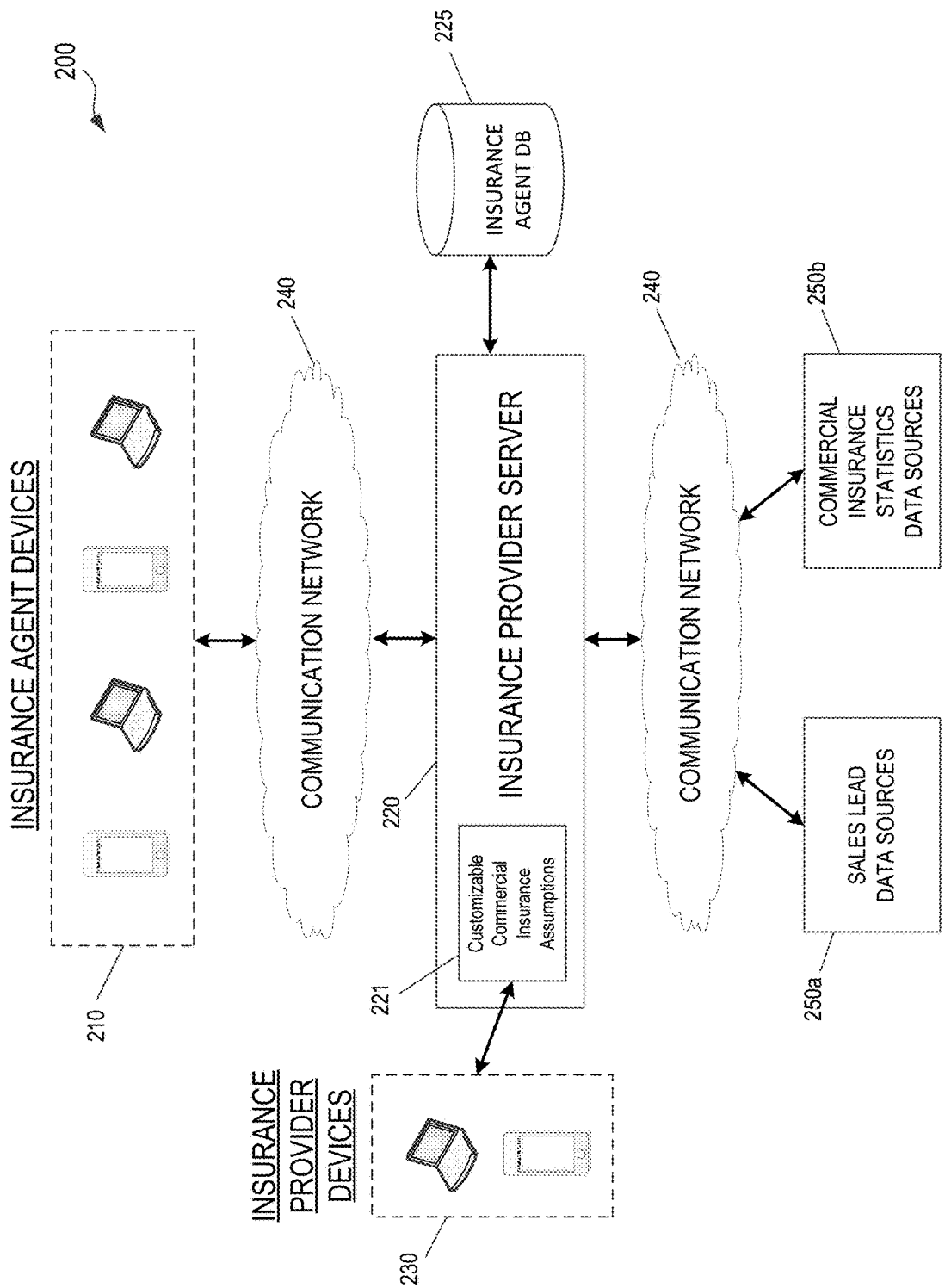
FIG. 2 is a diagram illustrating the components of an example commercial insurance growth data system, according to one or more aspects of the disclosure.

FIG. 2 is a diagram showing an illustrative commercial insurance growth data system 200. In this example system diagram, an insurance provider server 220 may communicate via one or more communication networks 240 with insurance agent computing devices 210, insurance provider computing devices 230, and one or more data sources 250. The commercial insurance growth data system 200 in this example also includes customizable data 221 corresponding to a set of commercial insurance assumptions, and an insurance agent database 225, one or both of which may be incorporated into the insurance provider server 220 or implemented within separate devices or systems. Each component shown in FIG. 2 may be implemented in hardware, software, or a combination of the two. Additionally, each component of the commercial insurance growth data system 200 may include a computing device (or system) having some or all of the structural components described above for computing device 101.

Insurance provider server 220 in the commercial insurance growth data system 200 may be, for example, a computer server having some or all of the structural components described above for computing device 101. As described below in more detail, an insurance provider server 220 may be configured to provide one or more software applications related to commercial insurance growth goal to provide commercial insurance growth software applications to insurance agents 210, to analyze commercial insurance data, and to generate commercial insurance growth data packages for insurance agents. In order to perform these and others functions described herein, in some embodiments, an insurance provider server 220 may include one or more processing units (e.g., single-core, dual-core, or quad-core processors, etc.) having a minimum sufficient bit size (e.g., 32-bit, 64-bit, 96-bit, 128-bit, etc.) and minimum required processor speeds (e.g., 500 MHz, 1 GHz, etc.), and sufficient volatile and nonvolatile memory (e.g., at least 256 MB of RAM, at least 5 GB of memory, etc.), in order to store and execute one or more such commercial insurance software applications (e.g., including various different versions, upgrades, etc.), establish communication sessions with and distribute applications to various insurance agent computing devices 210, receive and process data from computing devices 210, 230, and 250, and generate commercial insurance growth data for insurance agents. Additionally, as described below, private and secure data may be transmitted between the insurance provider server 220 and various computing devices 210, 230, and 250, such as insurance agent business data, sales lead data, etc. Therefore, in some embodiments, an insurance provider server 220 may include various security and/or integration components (e.g., web servers, authentication servers) and/or various network components (e.g., firewalls, routers, gateways, load balancers, etc.). The insurance provider server 220 also may provide and/or require communications over certain secure protocols or encryption techniques (e.g., FTP or SFTP, PGP, HTTP or HTTPS, SOAP, XML encryption, etc.), in order to protect the private or secure data transmitted between the insurance provider server 220 and various computing devices 210, 230 and 250.

The commercial insurance growth data system 200 in this example also includes a plurality of client computing devices configured to communicate with the insurance provider server 220, including insurance agent client devices 210 and insurance provider client devices 230. Insurance agent devices 210 may include personal computers, mobile devices, and servers operated by insurance agents associated with to the insurance provider. Insurance provider devices 230 may include similar devices that are operated by employees or administrators of the insurance provider itself, rather than by an insurance agent associated with the insurance provider. As discussed below, insurance agent client devices 210 and insurance provider client devices 230 each may be configured to receive and execute software, and to interact with the insurance provider server 220. For example, insurance provider client devices 230 may interact with the insurance provider server 220 to set commercial insurance assumption data 221, retrieve and update insurance agent data 225, and configure interactions with various commercial insurance data sources 250. Insurance agent client devices 210 may interact with the insurance provider server 220 to request and receive commercial insurance growth data, directly or via client applications (e.g., web-based or mobile applications) executing on the agent devices 210. Insurance agent client devices 210 may also upload agent data 225 and/or customize certain commercial insurance assumptions 221 when executing certain growth scenarios, as described below. Accordingly, in various different embodiments, client computing devices 210 and 230 may include one or more processing units having a minimum sufficient bit size (e.g., 32-bit, 64-bit, etc.) and minimum required processor speeds (e.g., 233 MHz, 500 MHz, etc.), and sufficient volatile and nonvolatile memory (e.g., at least 256 MB of RAM, at least 1 GB of memory, etc.), in order to store and execute commercial insurance software applications, execute its designated functionality, and establish communications with an insurance provider server 220 and/or various other devices (e.g., other client devices 210 and 230, data sources 250, etc.) to transmit or receive insurance agent data, commercial insurance statistics and assumptions, sales lead data, etc. Additionally, the client computing devices 210 and 230 may receive and transmit private or secure data, such as insurance agent business data, sales lead data, etc. Therefore, in some embodiments, the client computing devices 210 and 230 may include various network components (e.g., firewalls, routers, gateways, load balancers, etc.), and may provide and/or require communications over certain secure protocols or encryption techniques (e.g., FTP or SFTP, PGP, HTTP or HTTPS, SOAP, XML encryption, etc.)

As shown in FIG. 2, the client computing devices 210 and 230 may include a variety of different types of devices, including mobile user devices (e.g., smartphones, personal digital assistants, tablet computers, etc.), personal and office desktop computers, and servers. Each client computing devices 210 and 230 in the commercial insurance growth data system 200 may include some or all of the elements described above with respect to the computing device 101, such as network interfaces, memory caches, security and/or integration hardware and software components. Client computing devices 210 and 230 may receive one or more specialized software applications from the insurance provider server 220, a public or private application store, or other components in the commercial insurance growth data system 200, which are configured to execute and interact with the server 220 to perform the functionality of the commercial insurance growth data system 200. Such client software applications may be web-based or non-web-based applications (e.g., standalone applications or application bundles), and may include various user interface screens to allow users to view and update commercial insurance assumptions, retrieve commercial insurance statistics, upload and retrieve agent data, and request and receive insurance agent growth data packages based on agent characteristics and growth specifications, as described in more detail in reference to FIG. 3.

To perform analyses of insurance agent characteristics and growth specifications, and to generate commercial insurance growth data packages, an insurance provider server 220 may receive data from additional computer systems 250 having data that may be relevant to the commercial insurance agent analyses and determinations. For example, one or more sales lead data sources 250a may store sales lead data that includes the leads themselves (e.g., potential customer names, contact information, business profile information, business locations, etc.) as well as additional metrics, metadata, or characteristics relating to the leads (e.g., prices of leads, newness of leads, exclusivity of leads, previous attempts to contact or close leads, etc.). Additionally, commercial insurance statistics data sources 250b may store and provide commercial insurance data to the server 220, for example, average commercial insurance premiums, deductibles, and coverage limits (e.g., by business segment, business size, insurance type, geographic location, etc.), previous insurance claim data and settlement data (e.g., across various business segments, geographic locations, business sizes, insurance providers, etc.), commercial insurance liability limits in various jurisdictions, and other types of commercial insurance data. As discussed below in FIG. 3, the insurance provider server 220 may retrieve data from one or more data sources 250 and may use the data to analyze insurance agent characteristics, agent growth goals and other specifications, and to generate commercial insurance growth data for particular insurance agents.

Figure 3:
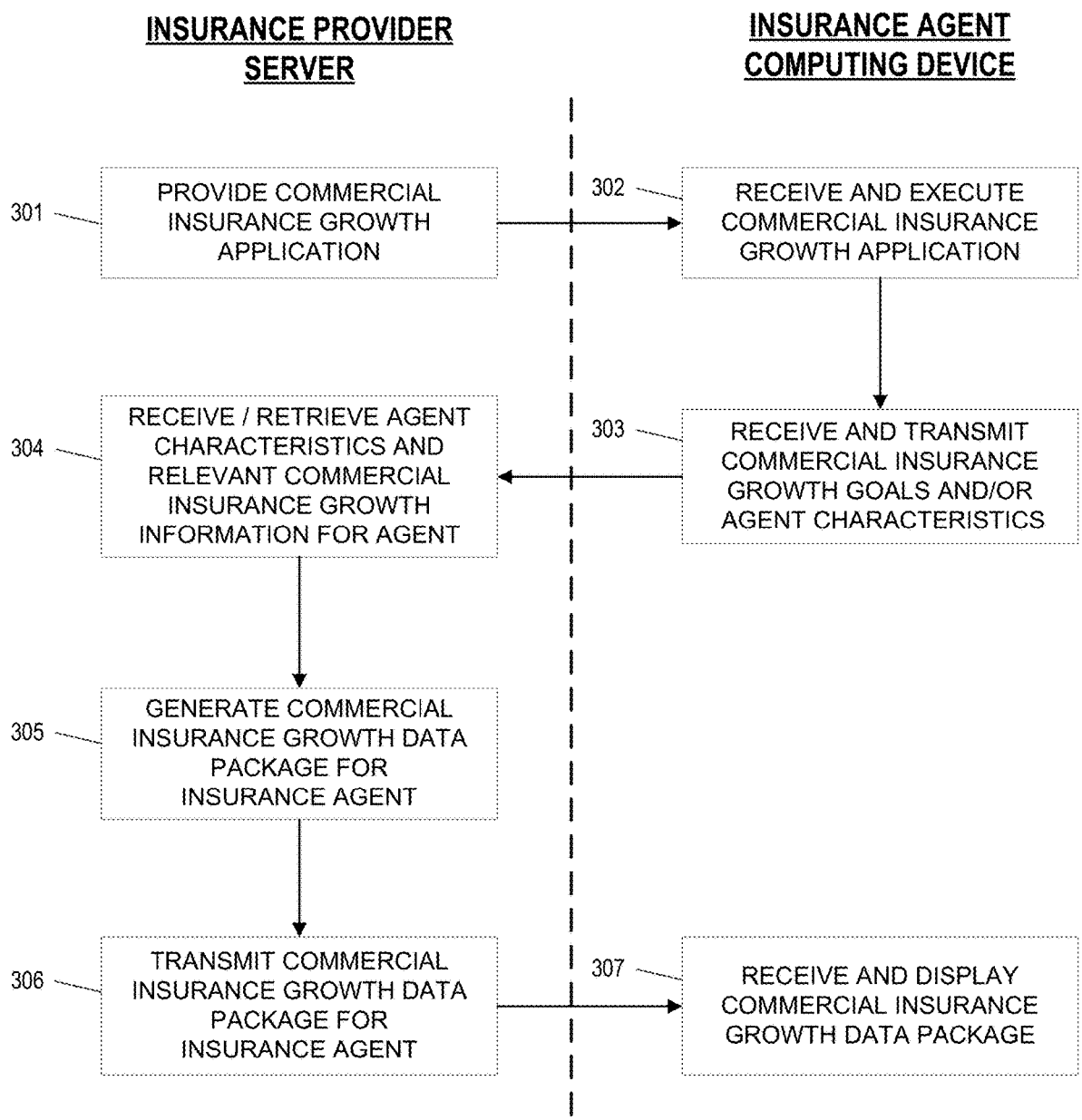
FIG. 3 is a flow diagram is shown illustrating an example process of generating and providing a commercial insurance growth data package to an insurance agent device, according to one or more aspects of the disclosure.

Referring now to FIG. 3, a flow diagram is shown illustrating a process of an insurance provider server generating and providing a commercial insurance growth data package to an insurance agent device.

In step 301, an insurance provider server (e.g., server 220) may provide a commercial insurance growth application to an insurance agent computer device (e.g., device 210), and in step 302 the insurance agent device 210 may receive and execute the commercial insurance growth application. As discussed below, such commercial insurance growth applications may allow insurance agents to request information and explore options for growing their commercial insurance businesses. Insurance agents that offer commercial insurance coverage to clients may specialize or focus on certain specific business segments. A business segment may refer to a collection of businesses that offer specific product or service types, or groups of related products or services. Business segments may include small, medium, or large businesses specializing in a specific product or service types, as well as distinguishable components of multi-segment business (e.g., business that sell products or services in multiple different segments). An example list of business segments is included in Appendix A. As discussed below in more detail, insurance provider servers may store separate data sets of commercial insurance data for each of the business segments listed in Appendix A (or other business segments lists) and may customize and provide agent-specific commercial insurance data sets corresponding to one or more business segments to an insurance agent.

The commercial insurance growth application may be provided to the insurance agent computer device 210 in steps 301-302 by means of a web page, or other web-based or non-web-based application. In some implementations of FIG. 3, an insurance agent device 210 may access interactive web content on an insurance provider server 220, using web browser software on the client device 210, and may interact with the web server 220 via the browser application to upload agent information and preferences, and to receive a commercial insurance data package, etc. In other implementations, a secure web-based or non-web-based software application may be provided to insurance agent computing devices 210 in steps 301-302 to enable future interactions between the insurance agent device 210 and the insurance provider server 220. For example, an insurance provider server 220 may make available, via a website or application store, a commercial insurance growth application that may be downloaded by authorized insurance agents associated with the insurance provider. In some cases, an insurance company server 220 may provide multiple different downloadable commercial insurance growth applications to different agent devices. For instance, different versions or releases of commercial insurance growth applications may be created with different features and information targeted to different sizes of insurance agents, insurance agents in different geographic regions, and/or insurance agents having different levels of experience or seniority, etc. Additionally, different commercial insurance growth applications may be provided in steps 301-302 based on the device type of the insurance agent device 210. For example, mobile applications may be created and provided to compatible mobile device types (e.g., based on device manufacturer, operating system, device capabilities, etc.), while desktop devices offering additional features and/or different sets of user interface components may be provided In any of these examples, an insurance agent device 210 may be required to provide valid credentials of an authorized insurance agent to the server 220 before accessing certain features and functionality of the server 220, such as a secure web-page for querying and retrieving commercial insurance data and leads, or before downloading a commercial insurance growth application. Whether communicating via web pages or with separate applications downloaded in steps 301-302, the insurance provider server 220 and insurance agent client 210 may be configured to use secure data transmission protocols and/or encryption, either for all communications, or for selected secure communications (e.g., transmission of agent data, sales leads, etc.).

In step 303, the commercial insurance growth software (e.g., website or application) executing on the insurance agent device 210 may receive various input data from the insurance agent (or an employee or representative of the insurance agent), for example, data describing the commercial insurance growth goals and/or various agent characteristics of the insurance agent. As discussed below, the commercial insurance growth software may be configured to provide customized commercial insurance growth data to insurance agents based on the insurance agent data collected. The data received in step 303 may be collected from the insurance agent via a form, wizard, or other interactive user interface.

The insurance agent input data received from the insurance agent in step 303 may include, for example, agent identification information, current agent business information, and the insurance agent's commercial insurance growth goals. Insurance agent identification information may include, for example, the agent's name, address, agent number or identifier, etc. In some cases, the interactive software tool might not be tied to a specific insurance provider, and thus the agent may be prompted to input the associated insurance provider(s) under which the agent operates. The current business information received from the agent in step 303 may include one or more of the agent's current size in number of employees, number of offices, number and types of customers, average customer sizes and account sizes, the agent type (e.g., level of seniority at the insurance provider), current amount of commercial insurance revenue, current amount of non-commercial revenue, etc. The commercial growth goals received from the insurance agent in step 303 may include the amount of growth the agent would like to achieve (e.g., in number of commercial customers, size of total commercial insurance revenues or premiums, amounts of commercial insurance coverage provided, etc.).

In some cases, certain agent data may be retrieved automatically by accessing various external data sources, so that the insurance agent need not manually input such information in step 303. For example, commercial insurance growth software executing on the agent device 210 and/or on the insurance server 220 may be configured to retrieve current agent identification information (e.g., agent size, office locations, etc.) and current business information (e.g., current customers, current revenue data, etc.) from an insurance agent database 225 or third-party insurance agent data source 250 (not shown in FIG. 2).

In some embodiments, insurance agents anonymously access and use the commercial insurance growth software tools, thereby allowing agents to input different combinations of current business data and commercial growth goals, including various combinations of accurate data and hypothetical data, to run specific business growth scenarios. In some cases, when an insurance agent uses the commercial insurance growth software anonymously, they may receive only a subset of the commercial growth data that identified and authorized agents would receive. For example, an agent anonymously using the software might receive industry analyses for certain business segments and a recommended number of sales leads needed to meet growth goals, but might not receive the sales leads themselves.

Additionally, the insurance agent may identify one or more specific business segments in step 303. Any business segments identified by the insurance agent may correspond to types of businesses for which the agent would like to enter the commercial insurance market or grow their commercial insurance business. For instance, the commercial insurance growth software on the insurance agent device 210 may display a selectable list of business segment types (e.g., Appendix A), which may be sorted or organized by industry or market sector. If the insurance agent has a particular interest, or relevant background knowledge pertaining to one or more of the business segments, the agent may select these within the user interface as desirable growth areas. The selected business segments may correspond to businesses for the agent is already involved and seeks to growth the business, or to new business segments that the agent is not currently involved in.

If an insurance agent selects one or more desired business segments in step 303, the insurance server 220 may be more likely to include the selected segments in the commercial insurance growth data package generated for the agent. However, if one or more of the business segments selected by the insurance agent is not appropriate for the agent, for example, based on the agent's current business and growth goals, then the insurance provider server 220 may determine that the business segment(s) selected by the agent should not be included in the agent's commercial insurance growth package, and may select other business segments instead. In other examples, the commercial insurance growth software may be configured to restrict the agent's selections to specific business segments or industry sectors, or so that the agent cannot select any specific business segments. In such examples, the determinations of business segments for growing the agent's commercial insurance business may be determined entirely by the insurance provider server 220 without any preferred business segments selected by the agent.

In step 304, the insurance provider server 220 may receive the agent characteristics and commercial insurance growth information from the insurance agent device 210 and/or other sources. For example, after retrieving agent identifying information in step 304, the insurance provider server 220 may be configured to retrieve various agent characteristics (e.g., agent size, locations, customers, revenue, etc.) from an insurance agent database 225 and/or third-party insurance agent data sources 250 (not shown in FIG. 2). As discussed below in step 305, the insurance provider server 220 also may retrieve agent characteristic data from a database 225 or data source 250 for other insurance agents in similar geographic regions, having similar agent types, and/or in business segments, when generating the customized commercial insurance growth package for the insurance agent.

Additional information may be retrieved by the insurance provider server 220 in step 304, such as a set of configurable assumptions for commercial insurance growth and a set of relevant commercial insurance statistics. As discussed below, the insurance provider server 220 may use configurable assumptions and insurance statistics to generate the commercial insurance growth data for an insurance agent.

Various combinations of different configurable commercial insurance assumptions may be supported in different implementations. The commercial insurance assumptions may relate to the commercial insurance book of the insurance agent (or a general insurance agent), such as the policy retention rate for commercial auto insurance policies, the policy retention rate for commercial business owners policies (BOP), the projected increase or decrease in the renewal rate for commercial auto insurance policies, and the projected increase or decrease in the renewal rate for commercial BOP policies. Additional commercial insurance assumptions may relate to the insurance agent's commissions, such as an agency success factor (e.g., 0-5%), a customer experience commission (e.g. 0-5%), a household bundling commission (e.g., 0-5%), a portfolio growth commission (e.g., 0-10%), and an agency development bonus commission. Additional potential assumptions may relate to sales lead estimation, such as a sales lead turnover ratio assumption (e.g., quotes per sales lead contact) and a sales lead close ratio (e.g., sales per quote), and/or other sales lead expenses, such as a telemarketing cost assumption.

Figure 4:
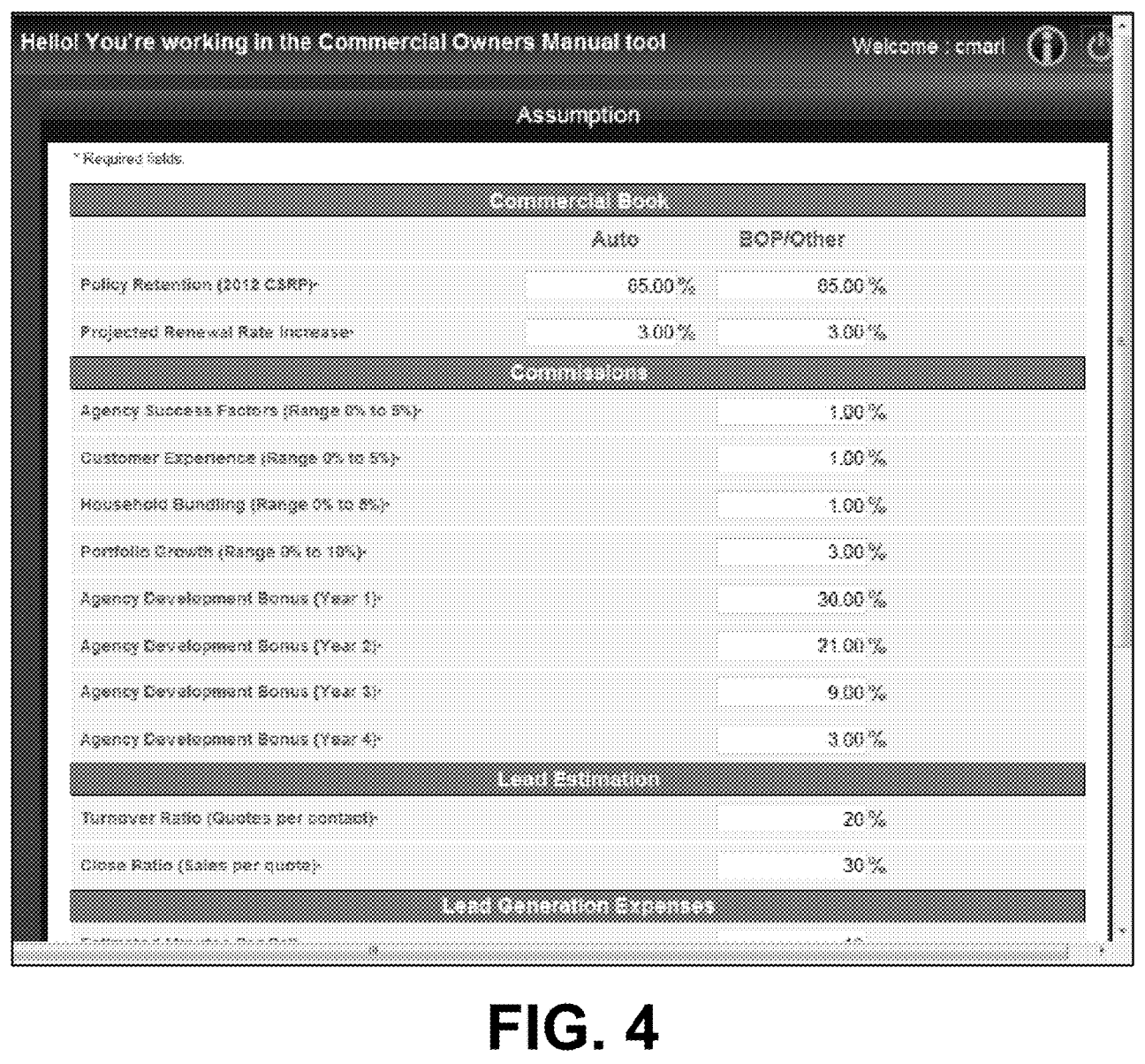

FIG. 4 shows an example of an assumption configuration user interface screen. In this example, the user interface includes several configurable assumptions relating to the agent's commercial book, commissions, lead estimation, and lead generation. In various different embodiments, the set of assumptions may be configurable by the insurance agent, by an administrator of the insurance provider, or both.

Along with the configurable assumptions discussed above, the insurance provider server 220 may retrieve a set of commercial insurance statistics in step 304, which may be used to generate the commercial insurance growth data for the insurance agent in step 305. Such commercial insurance statistics may include insurance premium data, such as the average premium price for different types of commercial insurance policies (e.g., commercial auto, commercial BOP), for different business segments, in different geographic locations (e.g., cities, states, etc.).

Referring now to FIG. 5, an example list of average state-by-state commercial insurance premiums list is shown. Such insurance statistics may be maintained by an insurance provider server 220 and/or may be retrieved from a third-party data source 250b. In some examples, such commercial insurance statistics also may be configurable by an insurance agent and/or an insurance provider administrator. In certain implementations, a commercial insurance growth software tool may provide a user interface to allow the insurance agent to temporarily edit any commercial insurance statistics before generating the commercial insurance growth data in step 305. For instance, an insurance agent may wish to execute an alternative scenario for growth based on an assumption that average insurance premiums (or any other commercial insurance statistics) may increase or decrease in the future.

In step 305, the insurance provider server 220 may generate a commercial growth data package for the insurance agent, based on the agent's characteristics and commercial growth goals and/or the additional assumptions and insurance data received in step 304. As discussed below, the commercial growth data package may be a customized data package including, for example, a set of suggested business segments for the insurance agent, market analyses and risk and coverage options for the selected business segments, and business plans and growth projections for the insurance agent to achieve the desired commercial growth goals. Additionally, the commercial growth data may include the sales lead data (e.g., a required number of leads, lead sources and costs, etc.) and/or the sales leads themselves that correspond to the agent's commercial growth plan.

As part of generating the commercial growth data package in step 305, the insurance provider server 220 may identify one or more recommended business segments for the insurance agent. Recommendations of business segments for the insurance agent may be based on the insurance agent's characteristics (e.g., locations, office sizes and personnel, current book of business and specialized knowledge and facilities), and the insurance agent's growth goals (e.g., amount of desired growth and time period for desired growth).

A variety of analyses techniques may be used to identify business segment recommendations for the insurance agent in step 305. In some cases, the insurance provider server 220 may analyze all commercial businesses in the geographic region near the insurance agent. For example, a geographic region corresponding to a configurable radius distance (e.g., 5 miles, 10 miles, 20 miles, etc.) from each of the agent's office locations may be selected, and all businesses within that geographic region may be identified and cataloged. Such a catalog may include all business segment types in the geographic region of the agent, the numbers of businesses of each segment type, the average sizes of the businesses from each type, etc. For example, an analysis of a geographic region near the various offices of a first insurance agent may determine that several beauty salons are located in this geographic region, while a similar analysis for a second insurance agent may identify several hardware stores near the offices of the second agent, etc. The size of these businesses and other characteristics also may be analyzed in step 305 (e.g., revenues, number of employees, number of vehicles, restricted growth locations, previous insurance claims files, etc.), in order to determine which business segments may be selected (or recommended) for certain insurance agents.

The analysis in step 305 also may include various market analyses and growth forecasts of the different industries and business segments operating near the insurance agent. For instance, the projected industry growth (in revenue and business locations) for different business segments may be analyzed and used to determine which business segments may be selected (or recommended) for certain insurance agents. Recent industry developments and other news may also be considered, such as new taxes or legislation affecting specific industries and/or regions, macroeconomic factors, development of new technologies or new industries in certain industries and/or regions, etc.

Relevant insurance data and competitive analyses of other insurance providers operating in the same industries and/or regions may also be included in the determination of business segments in step 305. For example, the average commercial insurance premiums and insurance claim resolution data for specific industries and/or in specific regions may be analyzed to select one or more business segments for an insurance agent. Additional insurance metrics, such as customer retention rates, sales lead success rates, and the like, may be retrieved for the specific relevant business segments and/or geographic regions, and used in the analysis in step 305. The cost and availability of sales leads in the relevant business segment(s) and geographic area(s) may also be used in the analysis. Competitive analyses may be used for determinations of business segments for insurance agents, including the number and size of insurance competitors in different relevant regions and/or business segments, the insurance products offered and rates charged by competitors, and any recent industry developments regarding competitors (e.g., new commercial insurance competitors expanding into the region, or existing commercial insurance competitors downsizing or leaving an area, etc.).

Additionally, the analysis in step 305 also may include an analysis of the insurance features and characteristics of the insurance agent and insurance provider. For example, one insurance provider may offer certain coverage types, rate guarantees, discounts, or other insurance features not offered by other insurance providers that provide particular advantages for commercial insurance customers in specific business segments and/or in specific geographic regions. Similarly, the office locations, facilities, staff experience and expertise, and other characteristics of the insurance provider or insurance agent may provide advantages for certain potential insurance customers in certain business segments. Thus, these insurance features and characteristics of the insurance agent and insurance provider may also be used to select one or more business segments for the insurance agent in step 305.

After performing an initial selection of the business segment(s) that may be recommended to the insurance agent, the commercial insurance growth goals provided by the insurance agent may be analyzed to develop a feasible business plan for achieving the growth goals by expanding the agent's commercial business into the selected business segments. In this portion of the analysis in step 305, the sales lead success rates (lead turnover ratio, lead close ratio, etc.), insurance coverage types and average premium rates, customer retention rates, and other insurance data may first be analyzed to determine if it the agent's commercial growth goals are feasible using the selected business segments. If not, additional business segments may be selected, or the insurance agent may be informed that the selected goals are not feasible at this time. If the agent's stated commercial growth goals are features, then the analysis in step 305 may include using the retrieved insurance data, such as sales lead success rates, average premiums, customer retention rates, etc., to calculate the number sales leads that will be required for the insurance agent to achieve the commercial insurance growth goals. As discussed above, some or all of this insurance data may be specific to the business segment(s) and/or the relevant geographic region associated with the insurance agent.

The calculation of a sales lead number and the development of a business plan in step 305 may also factor in the costs associated with expanding the commercial business of the insurance agent. For example, the insurance agent may need to incur costs in order to reach its growth goals, such as additional staff, expanded facilities or new office locations, etc. If the business growth plan involves the agent moving into new business segments for which the agent does not have experience or a current customer base, the expected costs may also include personnel training and research into the new business segment. Additionally, sales leads are often purchased from third-party sales lead providers, and thus the costs of the leads (which may depend on business segment, location, the quality or freshness of the leads, etc.) may be factored into the expected growth costs in step 305.

Thus, the business plan developed for the insurance agent in step 305 may incorporate growth projections and expected costs for the agent to enter (or expand) into commercial insurance business in the selected business segments over time to achieve the agent's growth goals. The business plan may include both short-term and long-term growth projections and costs, with iterative growth projections and goals from the current time until the commercial insurance growth goals are reached. For example, as discussed above, the insurance provider server 220 may calculate the number of sales leads required for the insurance agent to achieve its stated commercial growth goals. In some cases, the calculation of sales may be divided into the different selected business segments and divided by year.

For instance, a business plan may involve purchasing and using X sales leads for a first business segment in the first year of the growth plan, then purchasing and using Y sales leads for the first business segment and Z sales leads for a second business segment in the second year of the business plan, etc. As discussed below, the business plan developed in step 305 may also include an action plan including organizational changes, hiring, staff training, and the like, to achieve to the agent's commercial growth goals.

As discussed above, the analysis in step 305 may include the selection of one or more business segments for an insurance agent, a cost-benefit analysis of entering into (or expanding within) the commercial insurance market for those business segments, and the development of a specific business plan for the agent based on the commercial growth goals input by the insurance agent. In some cases, the business segments may be selected automatically for the insurance agent as described above, for example, using the agent's office locations and other characteristics, industry and market analyses, and the like. However, in other cases, a commercial insurance growth data system 200 may allow the insurance agent to partially or entirely select the business segments that the agent will enter into (or expand within) to achieve the growth goals. For example, as discussed above, a user interface provided via the insurance agent device 210 may be configured receive selections of desired industries and/or business segments from an insurance agent. In these examples, the insurance provider server 220 may be configured to calculate the growth projections and expected cost, and to develop the business plan for the insurance agent using only the business segments selected by the agent. Alternatively, the insurance provider server 220 in these cases may be configured to develop multiple business plans, including one or more business plans based on the business segments selected by the agent, one or more business plans based on business segments automatically selected for the insurance agent by the insurance provider server 220, and/or one or more business plans based on a combination of the business segments selected by agent and the server 220. In other cases, the insurance provider server 220 may be configured to automatically select and present a list of business segments to the insurance agent via the software user interface, and allow the insurance agent to select or deselect specific business segments based on the agent's background, expertise, and industry areas of interest. After an insurance agent selects new business segments or deselects existing business segments via the software user interface on the insurance agent device 210, the insurance provider server 220 may update the growth projections, expected costs, action plans, etc., based on the updated set of business segments. Additionally, where applicable, the insurance provider server 220 may be configured to generate multiple commercial insurance growth data packages for the insurance agent in step 305 (e.g., including action plans, growth projections, expected costs, numbers of sales leads required, etc.), for each separate business plan or combination of business segments.

Finally, in step 305, one or more commercial insurance growth data packages may be generated for the insurance agent. A commercial insurance growth data package may include growth projections, expected costs, sales leads, action plans, and a variety of additional information determined based on the analysis described above. The commercial insurance growth data packages may be customized based on the specific agent characteristics and commercial growth goals provided by the agent, as well as based on retrieved insurance statistics, configurable assumptions, market data, and the like. For example, commercial insurance growth data packages may include industry and market analyses for the selected business segments, projected growth analyses for the business segments and the corresponding commercial insurance business, numbers of required sales leads for various business segments, commercial growth action plans, growth forecasts, etc. The commercial insurance growth data packages may also include the underlying insurance data and assumptions upon which the business plans and other data are based on. Additionally, in some cases, the commercial insurance growth data packages may include lists of sales leads, including lead maps.

Figures 6A, 6B:
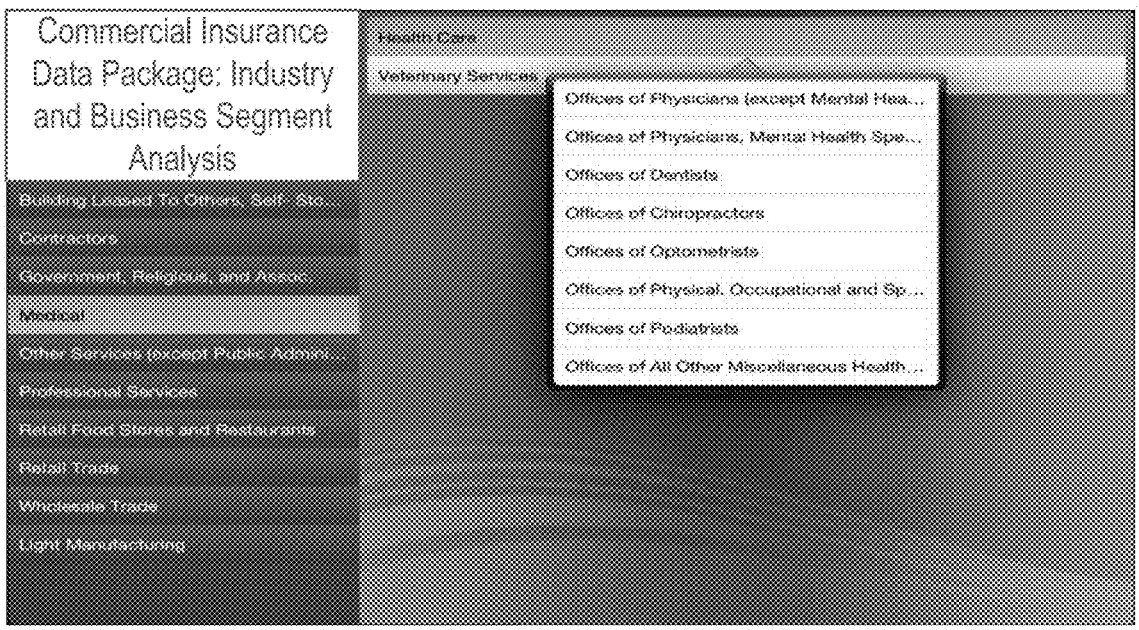

FIGS. 6A-11B are sample user interface screens (or may alternatively be pages of fixed content in a document) providing various examples of the data that may be included in a commercial insurance growth data package. For example, FIG. 6A is an example user interface selection screen for an industry and business segments analysis tool. In this example, an insurance agent may browse and select various industries and business segments via the interactive user interface. After selecting a specific business segment (e.g., optometrists), one or more screens of additional industry data regarding the business segment may be displayed in the user interface, as shown in FIG. 6B. In this example, after user selects the health care industry and then the business segment optometrists from the selection user interface in the FIG. 6A, the user interface is updated in FIG. 6B with the insurance risk, solution, and value data specific to the selected business segment. In other examples, rather than (or in addition to) the risk/solution/value data in FIG. 6B, the user interface provided to the agent may include an industry background, market analysis, and other data specific to the selected business segment.

In some examples, business segment data such as industry analyses, projections, and risk/solution/value data may be provided to insurance agents in step 307, along with the commercial insurance growth data packages corresponding to their selected business segments. In other examples, the software tools provided by the insurance provider server 220 may allow the insurance agent to browse and research relevant industry data for any business segment, for instance, to enable to insurance agent to select desired business segments in step 303. Thus, the insurance provider server 220 and/or a combination of third-party data sources 250 may store and update industry data for a comprehensive list of business segments, such as the business segment list in Appendix A. Such data may include, for example, market growth projections, industry analyses, insurance risk/solution/value data, commercial insurance statistics, a sales lead database, etc., for each separate business segment listed in Appendix A or other business segment list. Thus, interactive software tool shown in FIGS. 6A-6B may provide current commercial insurance information to insurance agents, including automatic update alerts and notifications (e.g., via email, text message, or via the software tool) for any of the agent's current and/or prospective business segments.

FIG. 7 is another example user interface screen that may be incorporated into a customized commercial insurance growth package for an insurance agent in step 305. In this example, a 5-year commercial growth summary is shown, including each year's expected commercial premiums, required leads, expected revenues, and expected expenses corresponding to the insurance agent's commercial growth plan. FIG. 7 also includes 5-year charts corresponding to the expected cash flows and commercial book breakdown for the insurance agent following the commercial growth plan.

FIG. 8 is another example user interface screen that may be included in a customized commercial insurance growth package for an insurance agent in step 305. In this example, FIG. 8 provides the set of underlying assumptions used by the insurance provider server 220 to perform the analyses generate the commercial insurance growth data package, along with the anticipated first-year expenses for insurance agent following the commercial growth plan (e.g., lead costs, telemarketing costs, etc.).

Figure 10:
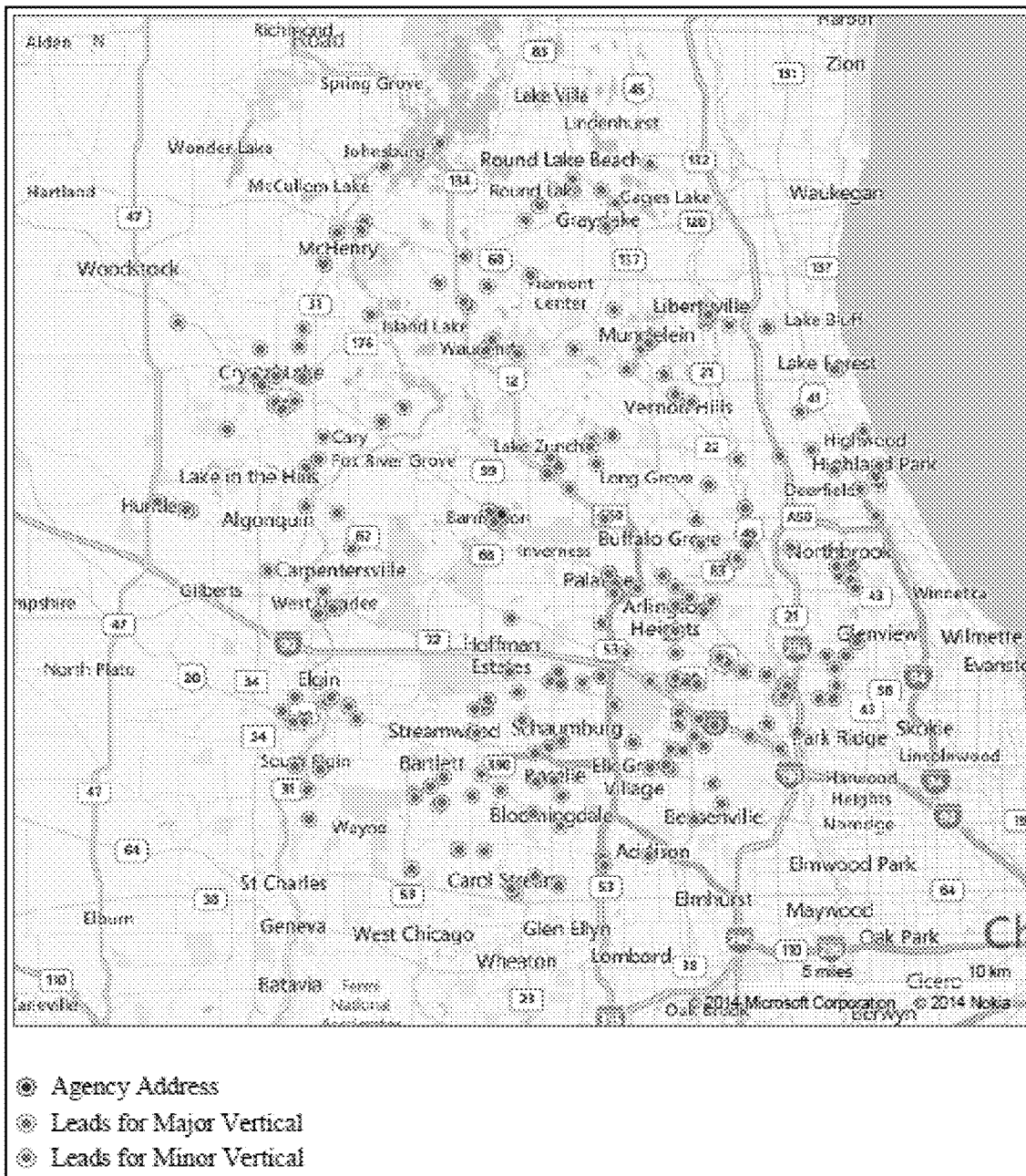

FIGS. 9 and 10 include example sales lead data that may be included a commercial insurance growth data package for an insurance agent. As shown in these examples, sales leads may be presented in a variety of formats, including spreadsheets (FIG. 9) or lead maps (FIG. 10). For examples in which sales leads are included into commercial insurance growth data packages, the insurance provider server 220 may be configured to automatically obtain the set of leads, for example, by purchasing the required number of leads in the appropriate business segments and geographic region from a third-party sales lead provider. In other examples, a commercial insurance growth data package need not include the sales leads themselves, but might only include the number(s) of sales leads that will be required for the commercial growth plan proposed for the insurance agent.

Insurance provider servers 220 may provide sales leads to insurance agent device 210 either at the same time or separately from the commercial insurance growth data package (step 307). In either cases, the insurance provider server 220 may retrieve those leads from an internal lead database or may purchase the leads from a third-party sales lead provider. In some cases, the insurance provider servers 220 may be configured to monitor and coordinate the distribution of leads to different agents. For example, insurance provider servers 220 divide sales leads into non-overlapping geographic regions for nearby insurance agents. Additionally, after providing a set of sales leads to a first agent, those leads may be locked for a period of time so that they will not be provided to any other agent during the locking period. An insurance provider server 220 may also track the insurance agent's use of the sales leads, for example, using a software tool and user interfaces in a commercial growth data package to determine which leads the agent has contacted, provided quotes to, closed on, etc., over predetermined time periods. In these examples, if an insurance agent has failed to follow and/or underperformed on a set of sales leads, the leads may be unlocked and potentially provided to other agents based on the performance of the first agent.

FIGS. 11A and 11B are example user interface screen showing two different insurance agent action plans for implementing a proposed commercial growth plan. In some examples, action plans for insurance agents may be customized based on the agent's size, type and/or seniority level. For instance, in this example the action plans in FIGS. 11A and 11B may correspond to the same or similar commercial growth plan for different types of agents of an insurance provider (e.g., new agents, emerging agent, mature agent, etc.).

Returning now to FIG. 3, in step 306 the commercial insurance growth data package generated in step 305 may be transmitted from the insurance provider server 220 to the insurance agent device 210. In step 307, the insurance agent device may receive and display the commercial insurance growth data package the insurance agent (or other insurance agent personnel). In various examples, a variety of different transmission techniques and content formats may be used for transmitting and displaying commercial insurance growth data packages. In some cases, secure protocols and/or encryption may be required for transmitting the commercial insurance growth data package in step 306, to protect the confidential agent data, sales leads, industry analyses, and the like, that may be in package.

Additionally, commercial insurance growth data packages may be stored and transmitted in different data formats, and different display software to be used insurance agent devices 210 in various examples. For instance, a commercial insurance growth data package may take the form a static document (e.g., WORD or PDF), web-based content (e.g., related web pages, scripted content, mark-up data, embedded applets, etc.), or may be an interactive software application that is executable on the insurance agent device 210. In some cases, the data formats(s) used for the commercial insurance growth data packages may depend on preferences of the insurance agent and insurance provider, and/or the device capabilities of the insurance agent device 210. For instance, an insurance agent may provide input in step 303 into the user interface of the software tool requesting a particular format suitable to the agent device 210. Alternatively, the device type and capabilities of the agent device 210 may be automatically detected and provided to the insurance provider server 220. In both cases, the server 220 may potentially generate the package in step 305 in a specific data format based on the agent preferences and/or agent device type and capabilities. For example, if the insurance agent device 210 is a smartphone or other mobile device, then the insurance provider server 220 may generate a simplified version of the data package with less detailed but easily accessible industry data, in order to save network bandwidth and/or device memory while allowing the agent with quick access to the most relevant data on the fly. In contrast, a larger version of the same package may be provided to the insurance agent's office computers 210, to allow the agent to study the more detailed industry analyses.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

APPENDIX A

EXAMPLE LIST OF BUSINESS SEGMENTS

Abrasive Blast Cleaning Services
Accountants
Acoustical Analysis Services
Actuaries
Acupuncturists
Addressing & Mailing Services
Adhesive Application Services
Adult Schools
Adventure Travel Agencies
Advertising Agencies
Aerial Surveying Services
Agricultural Support Service
Air Cleaners Dealers
Air Cleaning, Purifying & Monitoring Services
Air Conditioning Contractors
Air Freight Forwarding Services
Air Quality Monitoring Services
Aircraft Accessories, Parts & Supplies
Aircraft Engine Repair Services
Aircraft Instruction
Aircraft Rental
Airline Food Service Contractors
Ambulance Services
Amusement Places
Animal Breeders APPENDIX A-continued

EXAMPLE LIST OF BUSINESS SEGMENTS

Animal Hospitals
Annealing Services
Answering Services
Antique Appraisers
Antique Dealers
Antique Restoration
Apartment Rental/Property Management
Apparel
Apparel - Baby
Apparel - Big and Tall
Apparel - Children's
Apparel - Men's
Apparel - Natural Fiber Clothing
Apparel - Swimwear
Apparel - Women's
Appliance Dealers
Appliance Repair
Appraisal Services
Aquarium Dealers
Arcades
Architects
Art Dealers
Art Galleries
Art Instruction
Art Therapist
Artists and Entertainers
Arts & Crafts
Athletic Clothing Suppliers
Athletic Shoe Dealers
Auctioneers
Auto Parts Dealer
Auto Sales (New)
Auto Sales (Used)
Auto Wheel Alignment
Automobile Air Conditioning
Automobile Brokers
Automobile Customizing
Automobile Detailing
Automobile Inspection Stations
Automobile Part Supply
Automobile Rental
Automobile Restoration
Automobile Seat Covers and Upholstery
Automobile Service
Automobile Starter Repair
Automobile Towing
Automotive Roadside Service
Automotive Transmission Repair
Baby Equipment Rentals
Backhoe Service
Bail Bonds
Bait Shops
Bakery
Bakery Cleaning Services
Balloon Delivery
Balloon Tours
Banquet Facilities
Barber Schools
Barber Shop
Bars
Bathroom Safety Products Dealers
Beauty Schools
Beauty Shop/Salon
Bed and Breakfast Inn
Beef Farming
Beer and Ale Dealers
Beverage Machine Service
Bird Breeding
Board and Care Facilities
Boarding Houses
Boat Charters
Boat Covers, Upholstery
Boat Repairing
Boat Storage
Body Art, Tattoos, Piercing
Body Care Products Dealers
Body Waxing
Boiler Cleaning/Calibration Services APPENDIX A-continued

EXAMPLE LIST OF BUSINESS SEGMENTS

Book Dealers
Bookbinding Services
Bookkeepers
Booklet Printing Services
Boot and Shoe Repair
Bottled Water Dealers
Brake Service
Bridal Consultant
Bridal Shops
Builders Supply Delivery Service
Building Inspection Services
Building Materials Dealers
Building Movers
Business Card Printers
Business Coach
Business Forms Suppliers
Business Intelligence Consultants
Business Schools
Business Support Services
Butchers
Cabinet Makers
Cable Installation Services
Cable TV Service
CAD/CAM Services
Cafes
Cafeterias
Cake Decorating
Camera Equipment Dealers
Camper Sales
Candle Shops
Candymakers
Car Washes
Car Washing and Polishing
Carburetor Repair Shops
Careers Advisor
Carpenters
Carpet and Rug Cleaners
Carport Contractors
Carryout Foods
Cat Breeding
Caterers
CD, Records, Tapes Dealers
Cellular Phone Sales
Ceramic Coatings Services
Certified Public Accountants
Chain Restaurants
Charter Bus Services
Chemical Disposal and Recycling Services
Child Care Centers
Child Care Services
Children's Party Supplies
Chimney Cleaning
Chiropractors
Christmas Tree Farms
Cigar, Cigarette and Tobacco Dealers
Cinemas
Circuit Boards Repair and Service
Circuit Design and Layout Service
Civil Engineer
Cleaning Supplies Dealers
Closet Organizing
Clothing Alterations
Clothing Design Company
Clothing Resale
Coal Delivery
Cocktail Lounges
Coffee Houses
Coffee Kiosks
Coffee Shops
Coffee, Tea, Spice Suppliers
Coin Dealers
Coin Dealers
Coin Op Carwashes
Coin Op Laundry
Coin Op Machine Service
Collectibles Dealers
Collection Agencies
Commercial Aircraft Washing Services APPENDIX A-continued

EXAMPLE LIST OF BUSINESS SEGMENTS

Commercial Steam Cleaning
Commodity Brokers
Communications Equipment Repair
Computer Backup Services
Computer Consulting
Computer Network Consultants
Computer Printer Supplies Dealers
Computer Programming
Computer Refurbishment
Computer Service/Repair
Computer/Technology Instruction
Concrete Contractors
Concrete Cutting Contractors
Concrete Suppliers
Confectionery & Nut Dealers
Conference Organization Service
Consignment Shops
Construction Forms Supplier
Consumer Electronics Dealers
Contract Packaging
Contract Parts Cleaning Service
Convalescent Care
Convenience Stores
Cookie Shops
Cooking/Gourmet Equipment Sales
Corporate Fitness Consultant
Cosmetics Sales
Cost Reduction Consultants
Costume Rental
Court Reporters
Court Reporting Schools
Craft Malls
Craft Supplies Dealers
Credit and Debt Counseling Services
Custom Drapery Makers
Custom Embroidery
Cyclery
Dance Studios
Data Processing Services
Data Storage Products Suppliers
Dating Services
Day Spas
Delicatessens
Desktop Publishing
Diaper Services
Dietician and Nutritional Counseling
Disc Jockeys
Discount Stores
Diving Schools
Dog Breeding
Doll Hospitals & Repair
Dollar Stores
Domestic Service Agencies
Domestic Services
Doughnut Shops
Drafting
Drapery Cleaners
Drapery Installation
Drapery Repair
Drive In Theaters
Driveway Contractors
Driving Instructors
Driving Schools
Drug Stores
Dry Cleaners
Drywall Contractors
Dynamic Balancing Services
E-Commerce Consultants
Educational Services
Electrical Contractors
Electrolysis
Electronic Bookkeeping Services
Elevator Inspection Services
Employment Agencies/Consultants
Energy Conservation Dealers
Engine Rebuilding
Engineer
Engravers
Escrow Services
Event Planners
Excavating Contractors
Executive Placement Services
Exercise Equipment Repair
Exercise Equipment Sales
Exhaust System Repair
Fabric Laminating Services
Fabric Shops
Fabricating Services
Facial Salons
Facsimile Transmission Service
Farm Equipment Operators
Farm Equipment Sales
Farming
Fast Food Franchises
Feed Dealers
Fencing Contractors
Financial Planners and Consultants
Fire Damage Restoration
Fire Extinguisher Sales
First Aid Kit Sales
Fish and Seafood Markets
Fish Hatcheries
Fishing Ponds
Fishing Tackle Dealers
Fitness Consultants
Floor Covering Dealers
Floor Coverings Dealers
Floor Waxing and Polishing Services
Food Service Supplies Dealers
Forestry Support Services
Forklift Sales and Service
Formalwear Rental/Sales
Framing & Art
Franchise Restaurants
Freight and Trucking
Frozen Yogurt Shops
Fuel Oil Delivery
Fundraising Services
Funeral Homes
Funeral Homes
Furnace Repair
Furniture Dealers
Furniture From Recycled Materials Dealers
Furniture Repairing
Garden & Lawn Sprinkler Contractors/Dealers
Garden Accessories
Garden Centers
Gardeners
Gas Stations
Geologist
Gift Baskets
Gift Shops
Glass Blowing Services
Glass Coating and Tinting
Glass Dealers/Installers
Glassware: Advertising
Global Positioning Systems Services
Golf Courses
Gourmet Food Dealers
GPS Hardware Dealers
Graffiti Removal Services
Granite Dealers
Graphic Designers
Graphics Services
Greeting Card Dealers
Grocers
Groundwater Monitoring & Testing Services
Guitar Dealers
Gun Dealers
Gymnastic Studio
Hair Removal
Handicapped Transportation Services
Handymen
Hauling
Hay Growers
Health and Diet Food Producers APPENDIX A-continued

EXAMPLE LIST OF BUSINESS SEGMENTS

Health Clubs
Health Food
Health Resorts
Hearing Aids
Heating Contractors
Heating Oil Dealers
Helicopter Services
Hobby Shops
Holography Services
Home Builders
Home Health Equipment Rental
Home Health Services
Home Improvements
Home Inspection Service
Home Rental/Property Management
Home Theater Dealers
Home Watch Services
Honey and Syrup Collectors
Horse Rentals
Horseshoeing
Hospices
Hospital Equipment and Supplies
Hot Dog Wagons
Hot Tub Dealers
Hot Tub Repair
Hot Tub Maintenance Service
Housecleaners
Household China & Dishware Dealers
Household Glassware Dealers
Hydraulic Equipment Repair
Hypnotherapists
Ice Dealers
Illustrator
Independent Insurance Agents
Independent Restaurants
Industrial Machine Maintenance Services
Industrial Polishing Services
Industrial/Technical Schools
Information Consultant
Inkjet Cartridge Refurbishing
Inline Skating Products Dealer
Instrument Installation Services
Insulation Contractors
Insurance Loss Adjuster Services
Interior Decorators/Designers
Internet Access Centers
Internet Cafes
Internet Entrepreneur
Internet Marketing
Intranet Consultants
Investigation Services
Investment Advisory Service
Irradiation Services
Irrigation Systems Dealers
Janitor Service
Janitors Equipment & Supplies
Jewelers
Jewelry Repairing
Karate Instruction
Kennels
Key Making
Kitchen Remodeling
Knitting & Needlework Instruction
Ladybug Breeding
Land Clearing
Land Subdivision & Development
Landscape Contractors
Landscaping
Laptop Computer Refurbishment
Laser Engraving Services
Laser Scribing Services
Laundries
Laundry and Dry Cleaning Supplies Dealers
Lawn Mower Dealers
Lawn Mower sharpening & Repair
Lawnmowing
Leather Goods Sales
Leather Repairing Legal Services
Legal Transcription
Lift Truck Services
Lighting Equipment Rental
Lighting Fixtures Dealers
Lighting Maintenance and Repair Services
Lighting Stores
Lightning Protection Equipment Installation/Services
Limousine Services
Linen Supply Services
Linens & Domestics Dealers
Lingerie Shops
Linoleum Dealers
Linoleum Layers
Liquor Stores (Carryout)
List Updating Services
Loan Brokers
Locksmiths
Logging
Luggage Dealers
Lumber Dealers
Lunch Service Catering
Machine Shops
Machine Tool Servicing
Machinery Installation Services
Mail Box Rental
Mail Order
Mail Order Returns Processing
Mailing List Dealer
Manicurist
Marine Equipment and Supplies
Marine Repair
Market Research
Marketing Publications
Marriage and Family Counselors
Martial Arts Instruction
Masonry Contractors
Masonry Supplies Dealers
Massage Therapists
Matchmaking Service
Materials Handling Equipment Dealers
Maternity Shops
Mattress and Sleep Furniture Dealers
Media Buying Services
Medial Transcription Service
Mediation Services
Medical Claims Billing
Medical Equipment and Supplies
Medical Laboratories
Medical Records Copying
Medical Transportation Service
Medical X-Ray Services
Meditation Studios
Metal Scrap Dealers
Microbrewery
Mini Blind and Window Treatments
Mink Breeding
Mobile Auto Glass
Mobile Home Dealer
Mobile Home Repair/Restoration
Mobile Home Supplies Dealers
Model Shops
Modeling Agency
Moisture Control Services
Monuments
Mortgage Brokers
Motels
Motorcycle Accessories Dealers
Motion Picture and Sound Recording
Motor Scooter Dealers
Motorcycle Dealers
Motorcycle Repair
Movers
Moving Equipment Rental
Museums
Music Dealers
Music Instruction
Musical Instrument Dealers APPENDIX A-continued

EXAMPLE LIST OF BUSINESS SEGMENTS

- Musical Instrument Repair
- Nail Artist
- Nail Salons
- Natural Pest Control Products
- Natural Pest Control Services
- News Dealers
- Newstands
- Nightclubs
- Non-store Retailers
- Notaries Public
- Nurseries
- Nursery Stock Suppliers
- Office Copier Supplies
- Office Machine Sales
- Office Machinery Rental and Leasing
- Office Record Storage Services
- Office Supplies
- Oil and Gas Extraction
- Oil Change & Lube
- One-Hour Photo Service
- Optical Coating Services
- Opticians
- Optometry
- Organic Food Growers/Supplier
- Organic Gardening Supply Dealers
- Organizing Services
- Outboard Motors Dealers/Repairs
- Outfitters and Guides
- Oven Repair Service
- Packaging Service
- Packing & Crating Service
- Paging & Signaling Service
- Paint Dealers
- Painting Contractors
- Pallet Suppliers
- Parking Lots/Garages
- Party Planning
- Party Sales
- Party Supplies
- Patent Research Services
- Patio & Deck Builders
- Patio Furniture Dealers
- Paving Contractors
- Pay Telephone Operators
- Payday Loans
- Payroll Preparation Service
- PDA Dealers
- Pedicurist
- Pension Administration Services
- Personal Coach
- Personal Concierge
- Personal Safety Instructors
- Personal Safety Products Dealers
- Personalized Label Suppliers
- Pest Control Services
- Pet Grooming
- Pet ID & Recovery Services
- Pet Memorials
- Pet Shops
- Pet Sitting & Boarding
- Pet Supplies
- Petting Zoos
- Pharmacies
- Photo Finishers
- Photographers
- Physical Therapists
- Piano Dealers
- Piano Tuning, Repairing
- Pipe and Cable Locating Services
- Pipe Contractors
- Pipe Inspection
- Pizza Restaurant
- Plant Dealers
- Plaster Contractors
- Plumbers
- Plumbing Fixture Dealers
- Podiatrists
- Pottery Dealers APPENDIX A-continued

EXAMPLE LIST OF BUSINESS SEGMENTS

- Poultry Farming
- Printers
- Privacy Consultants
- Private Investigators
- Private Sports Instruction
- Produce/Fruit Dealers
- Product Design Services
- Product Engineering Services
- Product Evaluation Services
- Product Fulfillment Services
- Product Safety Testing Services
- Propane Dealers
- Psychics
- Public Opinion Polling
- Public Relations Consultants
- Publishers
- Pump Dealers
- Pump Repair
- Quality Control Inspection Services
- Quarries
- Quilters
- Radiator Repair
- Rain Gutter Cleaning
- Rain Gutter Contractors
- Real Estate Appraisers
- Real Estate Title Services
- Realtors - Commercial
- Realtors - Residential
- Records/Document Management
- Recreational Vehicle Dealers
- Recreational Vehicle Parks
- Recreational Vehicle Rental
- Recycling Services
- Refrigeration Dealers/Repair
- Rehabilitation Hospitals
- Rehabilitation Outpatient Services
- Religious Book Stores
- Religious Goods Dealers
- Relocation Services
- Remodeling Contractors
- Rental Service Stores/Yards
- Reprographic Services
- Reptile Breeding
- Research and Development Services
- Residential Steam Cleaning
- Resorts
- Respiratory Treatment Services
- Restaurant Supplies Dealers
- Retirement Planning Services
- Riding Stables
- Roofing Contractors
- Roofing Material Suppliers
- Rotary Die Cutting Services
- Rubber Stamps
- Saddlery
- Safe and Vault Dealers
- Safety Equipment and Clothing
- Safety Training Services
- Safety Valve Testing Services
- Sales Lead Generation & Management Services
- Sales Presentation & Development Services
- Sampling Services
- Sand & Gravel Dealers
- Sandblasting Services
- Sandwich Shops
- Sanitation Service
- Satellite Equipment and Systems
- Saw Sharpening
- Scales - Repair and Service
- Scanning Services
- School Supplies Dealers
- Scrap Metal Processing
- Scrapbooking Dealers
- Screen Door/Window Dealers
- Screen Door/Window Screen Installation
- Screen Printing
- SCUBA Equipment Rental and Sales
- Second Hand Stores

APPENDIX A-continued

EXAMPLE LIST OF BUSINESS SEGMENTS

Secret Shopper Service
Secretarial Services
Securities Brokers
Security Guard Services
Security System Dealers
Self Storage Facilities
Self-Service Laundry
Seminar Production
Septic Tank Contractors
Service Contracts: Appliances
Service Station Equipment Suppliers
Sewing Machine Service/Repair
Shaved Ice Dealer
Sheet Metal Work
Shock Absorber Sales/Repair
Shoe Stores
Siding Contractors
Sign Installation Services
Sign Printers
Signmakers
Skateboard Dealers
Small Engine Rebuilding
Small Manufacturing - Chemicals
Small Manufacturing - Clay
Small Manufacturing - Glass Products
Small Manufacturing - Metal Products
Small Manufacturing - Plastics
Small Manufacturing - Rubber
Snackbars
Social Assistance
Social Therapists
Sod and Sodding Service
Software Duplication Services
Software Publisher
Software Sales
Solar Energy Systems Dealers
Soldering Services
Sound System Dealer/Repair
Souvenir Shops
Specialty Food Products
Specialty Furniture Manufacturing
Specialty Greeting Cards
Specialty Paper Suppliers
Specialty Transportation Services
Sporting Goods Dealers
Sports Activity Centers
Sports Bars
Sportswear Dealers
Spraying Services
Staffing Services
Stamp Dealers
Store Fixture Installation Services
Stove Dealers (Wood, Pellet, etc.)
Sun Glasses Dealers
Surveyors
Swimming Pool Contractors
Swimming Pool Service
T-Shirt Dealers
Taco Shops
Tailors
Tank Installation Services
Tanning Salons
Taverns
Tax Return Preparation
Taxicabs
Technical Writing Services
Teen Clothing & Accessories
Television Repair
Termite Control
Termite Inspection
Textile Bag Suppliers
Thrift Shops
Tile Contractors
Tile Dealers
Tire Dealers
Tool & Die Makers
Tool Dealers
Tour Operators
Toy Crafters
Toy Dealers
Trade Show Exhibition Services
Traffic Schools
Trailer Hitch Dealers/Installation
Trailer Repair Services
Transcription Services
Translation Service
Travel Agents
Tree Service
Trenching Service
Trophy Dealers
Truck Dealers
Truck Driving Schools
Truck Painting & Lettering
Truck Renting
Truck Stops
Truss Construction
Turbine Repair Services
Turnkey Building & Installation Services
Tutoring
Tuxedo Rental
Typesetting Services
Typographers
Ultrasonic Cleaning Services
Ultrasonic Inspection Services
Uniform Supply Service
Upholsterers
Used Equipment Dealers
Vacuum Cleaner Dealers/Repair
Valet Services
Van Conversion Services
Vegan Food Products Supplier
Vehicle Emissions Testing Services
Vending Services
Veterinary Services
Video Equipment Sales/Rentals
Video Inspection Services
Video Rentals
Video Tape Duplicating Services
Videographers
Vintage/Retro Clothing Retailers
Virtual Assistants
Wallpaper/Wallcovering Dealers
Wallpaper/Wallcovering Installation
Warehousing
Water Analysis Services
Water Damage Restoration
Water Haulers
Water Heaters Dealers/Repair
Water Purification & Filtration Services
Water Well Drillers
Watercraft Dealers
Website Designers
Wedding Chapels
Wedding Planners
Weight Control Services
Welcoming Services
Welding Equipment Leasing & Rental Services
Welding Repair
Window Blinds Dealers
Window Cleaning
Window Coverings Dealers
Window Dealers
Window Replacement
Window Tinting and Coating
Wine Dealers
Woodworking
Woodworking Supplies
Wrecking Service
Wrought Iron Dealers
Yoga Instruction

The invention claimed is:

1. An insurance provider server, comprising:
one or more processors;
one or more nonvolatile hardware memory units; and
one or more networking components,
wherein the insurance provider server is configured to access and employ the one or more nonvolatile hardware memory units and one or more processors to:
receive, from an insurance agent computing device associated with an insurance agent and via the one or more network components, an information request for commercial insurance growth data;
automatically detect a device type of the insurance agent computing device upon receiving the information request;
cause a first user interface to be displayed at the insurance agent computing device, wherein the first user interface is determined based on the detected device type and comprises a set of interface components configured to receive user input corresponding to a set of agent characteristics;
receive, from the insurance agent computing device and through a user interaction with one or more interface components of the first user interface, the set of agent characteristics of the insurance agent;
determine, based on the detected device type of the insurance agent computing device, a type of commercial insurance growth data package to generate;
generate, in response to the information request and in a format of the determined type of commercial insurance growth package, a commercial insurance growth data package related to one or more business segments, wherein the one or more business segments are determined, for the insurance agent, based on the received set of agent characteristics;
transmit, to the insurance agent computing device, via the one or more networking components, and in response to the information request, the commercial insurance growth data package; and
incorporate the commercial insurance growth data package into one or more interface components of the first user interface, wherein the incorporated commercial growth data package includes a first interface component providing a set of assumptions used to generate the commercial insurance growth data package and a second interface component providing one or more projected metrics associated with the commercial insurance growth data package.

2. The insurance provider server of claim 1, wherein the insurance provider server is further configured to access and employ the one or more nonvolatile hardware memory units and the one or more processors to:
retrieve, from an insurance agent database and based on an agent identifier received from the insurance agent computing device with the information request, additional agent characteristics; and
generate the commercial insurance growth data package for the insurance agent further based on the additional agent characteristics.

3. The insurance provider server of claim 1, wherein the insurance provider server is further configured to access and employ the one or more nonvolatile hardware memory units and the one or more processors to:
receive a commercial insurance growth goal from the insurance agent computing device;
retrieve one or more predetermined sales lead success assumptions for the one or more business segments; and
calculate, based on the commercial insurance growth goal and the predetermined sales lead success assumptions, a number of sales leads to provide to the insurance agent.

4. The insurance provider server of claim 1, wherein the insurance provider server is further configured to access and employ the one or more nonvolatile hardware memory units and the one or more processors to:
cause a second user interface to be displayed at the insurance agent computing device, the second user interface comprising a selectable list of business segments;
receive, from the insurance agent computing device and through the second user interface, a selection of one or more additional business segments from the selectable list of business segments; and
compile a set of business segment market analyses for each of the one or more business segments and the selected one or more additional business segments.

5. The insurance provider server of claim 3, wherein the insurance provider server is further configured to access and employ the one or more nonvolatile hardware memory units and the one or more processors to:
cause a second user interface to be displayed at the insurance agent computing device, the second user interface comprising a selectable list of business segments;
receive, from the insurance agent computing device and through the second user interface, a selection of at least one additional business segment from the selectable list of business segments;
determine, based on the commercial insurance growth goal and the predetermined sales lead success assumptions, that one or more additional business segments, of the at least one additional business segment, are unsuitable for the insurance agent;
based on determining that the one or more additional business segments are unsuitable, discarding the one or more additional business segments that are unsuitable; and
compile a set of business segment market analyses for each of the one or more business segments and the remaining additional business segments.

6. The insurance provider server of claim 1, wherein the insurance provider server is further configured to access and employ the one or more nonvolatile hardware memory units and the one or more processors to:
receive a commercial insurance growth goal from the insurance agent computing device;
determine an agent type of the insurance agent within an insurance company; and
generate the commercial insurance growth data package for the insurance agent further based on the commercial insurance growth goal and the agent type of the insurance agent.

7. The insurance provider server of claim 1, wherein the insurance provider server is further configured to access and employ the one or more nonvolatile hardware memory units and the one or more processors to:
receive a commercial insurance growth goal from the insurance agent computing device;

retrieve one or more predetermined sales lead costs, based on at least one of a geographic location associated with the insurance agent or the one or more business segments; and generate the commercial insurance growth data package for the insurance agent further based on the commercial insurance growth goal and the predetermined sales lead costs.

8. The insurance provider server of claim 1, wherein the insurance provider server is further configured to access and employ the one or more nonvolatile hardware memory units and the one or more processors to:

provide a set of commercial insurance sales leads to the insurance agent;

track, over a predetermined period of time, a performance level of the insurance agent with respect to the provided set of commercial insurance sales leads; and determine, based on the performance level of the insurance agent, whether to provide the provided set of commercial insurance sales leads to a second insurance agent.

9. The insurance provider server of claim 1, wherein the insurance provider server is further configured to access and employ the one or more nonvolatile hardware memory units and the one or more processors to:

receive a commercial insurance growth goal from the insurance agent computing device;

determine one or more commercial insurance policy retention rates for each of the one or more business segments; and generate the commercial insurance growth data package for the insurance agent further based on the commercial insurance growth goal and the determined one or more commercial insurance policy retention rates.

10. A method, comprising:

receiving, by an insurance provider server and from an insurance agent computing device associated with an insurance agent, an information request for commercial insurance growth data;

automatically detect a device type of the insurance agent computing device upon receiving the information request;

causing, by the insurance provider server, a first user interface to be displayed at the insurance agent computing device, wherein the first user interface is determined based on the detected device type and comprises a set of interface components configured to receive user input corresponding to a set of agent characteristics;

receiving, by the insurance provider server, from the insurance agent computing device and through a user interaction with one or more interface components of the first user interface, the set of agent characteristics of the insurance agent;

determining, based on the detected device type of the insurance agent computing device, a type of commercial insurance growth data package to generate;

generating, by the insurance provider server and in a format of the determined type of commercial insurance growth data package, a commercial insurance growth data package related to one or more business segments, wherein the one or more business segments are determined, for the insurance agent, based on the received set of agent characteristics;

transmitting, by the insurance provider server, to the insurance agent computing device, and in response to the information request, the commercial insurance growth data package; and incorporating the commercial insurance growth data package into one or more interface components of the first user interface, wherein the incorporated commercial growth data package includes a set of assumptions used to generate the commercial insurance growth data package and one or more projected metrics associated with the commercial insurance growth data package.

11. The method of claim 10, further comprising:

retrieving, from an insurance agent database and based on an agent identifier received from the insurance agent computing device with the information request, additional agent characteristics; and generating the commercial insurance growth data package further based on the additional agent characteristics.

12. The method of claim 10, further comprising:

causing a second user interface to be displayed at the insurance agent computing device, the second user interface comprising a selectable list of business segments;

receiving, from the insurance agent computing device and through the second user interface, a selection of one or more additional business segments from the selectable list of business segments; and compiling a set of market analyses for each of the one or more business segments and the selected one or more additional business segments.

13. The method of claim 10, further comprising:

receiving a commercial insurance growth goal from the insurance agent computing device;

retrieving one or more predetermined sales lead success assumptions for the one or more business segments; and calculating, based on the commercial insurance growth goal and the predetermined sales lead success assumptions, a number of sales leads to provide to the insurance agent.

14. The method of claim 10, further comprising:

receiving a commercial insurance growth goal from the insurance agent computing device;

determining an agent type of the insurance agent within an insurance company; and generating the commercial insurance growth data package for the insurance agent further based on the commercial insurance growth goal and the agent type of the insurance agent.

15. A commercial insurance growth data system comprising an insurance provider computer server, comprising:
one or more first processors;
one or more first networking components; and
one or more first nonvolatile hardware memory units, comprising an insurance agent database; and a first insurance agent computing device, comprising:
one or more second processors;
one or more second nonvolatile hardware memory units;
one or more display devices; and
one or more second networking components, wherein the insurance provider computer server is configured to access and employ the one or more first nonvolatile hardware memory units and the one or more first processors to:

receive, from the first insurance agent computing device associated with an insurance agent and via the one or more first network components, an information request for commercial insurance growth data;

automatically detect a device type of the first insurance agent computing device upon receiving the information request;

cause a first user interface to be displayed at the first insurance agent computing device, wherein the first user interface is determined based on the detected device type and comprises a set of interface components configured to receive user input corresponding to a set of agent characteristics;

receive, from the first insurance agent computing device and through a user interaction with one or more interface components of the first user interface, the set of agent characteristics of the insurance agent;

access the insurance agent database to retrieve additional insurance agent characteristics based on the information request;

determine, based on the detected device type of the first insurance agent computing device, a type of commercial insurance growth data package to generate;

generate, in a format of the determined type of commercial insurance growth data package, a commercial insurance growth data package related to one or more business segments, wherein the one or more business segments are determined, for the insurance agent, based on the received set of agent characteristics and the retrieved additional agent characteristics; and transmit, to the first insurance agent computing device, via the one or more first networking components, and in response to the information request, the commercial insurance growth data package;

incorporate the commercial insurance growth data package into one or more interface elements of the first user interface, wherein the incorporated commercial growth data package includes a set of assumptions used to generate the commercial insurance growth data package and with one or more projected metrics associated with the commercial insurance growth data package, and wherein the first insurance agent computing device is configured to access and employ the one or more second nonvolatile hardware memory units and the one or more second processors to:

detect information identifying the device type of the first insurance agent computing device;

transmit, to the insurance provider computer server, the information identifying the device type of the first insurance agent computing device and the information request, wherein the information request comprises an insurance agent identifier; receive the commercial insurance growth data package from the insurance provider computer server; and display the commercial insurance growth data package to an authenticated user via the one or more display devices, wherein the displayed commercial growth data package includes the set of assumptions used to generate the commercial insurance growth data package and the one or more projected metrics associated with the commercial insurance growth data package.

16. The commercial insurance growth data system of claim 15, wherein the insurance provider computer server is further configured to access and employ the one or more first nonvolatile hardware memory units and the one or more first processors to:

cause a second user interface to be displayed at the first insurance agent computing device, the second user interface comprising a selectable list of business segments;

receive a selection of one or more additional business segments from the selectable list of business segments; and compile a set of market analyses for each of the one or more business segments and the selected one or more additional business segments.

17. The commercial insurance growth data system of claim 15, wherein the insurance provider computer server is further configured to access and employ the one or more first nonvolatile hardware memory units and the one or more first processors to:

receive a commercial insurance growth goal from the first insurance agent computing device;

retrieve one or more predetermined sales lead success assumptions for the one or more business segments; and calculate, based on the commercial insurance growth goal and the predetermined sales lead success assumptions, a number of sales leads.

18. The commercial insurance growth data system of claim 15, wherein the insurance provider computer server is further configured to access and employ the one or more first nonvolatile hardware memory units and the one or more first processors to:

receive a commercial insurance growth goal from the first insurance agent computing device;

determine an agent type of the insurance agent associated with the first insurance agent computing device; and generate the commercial insurance growth data package further based on the commercial insurance growth goal and the agent type of the insurance agent.

19. The commercial insurance growth data system of claim 15, wherein the insurance provider computer server is further configured to access and employ the one or more first nonvolatile hardware memory units and one or more first processors to:

determine, based on the received set of agent characteristics and the retrieved additional agent characteristics, the one or more business segments for the insurance agent associated with the first insurance agent computing device; and compile a set of business segment market analyses for each of the determined one or more business segments.

20. The insurance provider server of claim 1, wherein the insurance provider server is further configured to access and employ the one or more nonvolatile hardware memory units and the one or more processors to:

generate a simplified commercial insurance growth data package based on determining that the information identifying the device type of the insurance agent computing device indicates that the insurance agent computing device is a mobile device.

* * * * *